F. ENOS, Jr.
CHICK FEEDER.
APPLICATION FILED AUG. 12, 1914.
1,138,365.
Patented May 4, 1915.
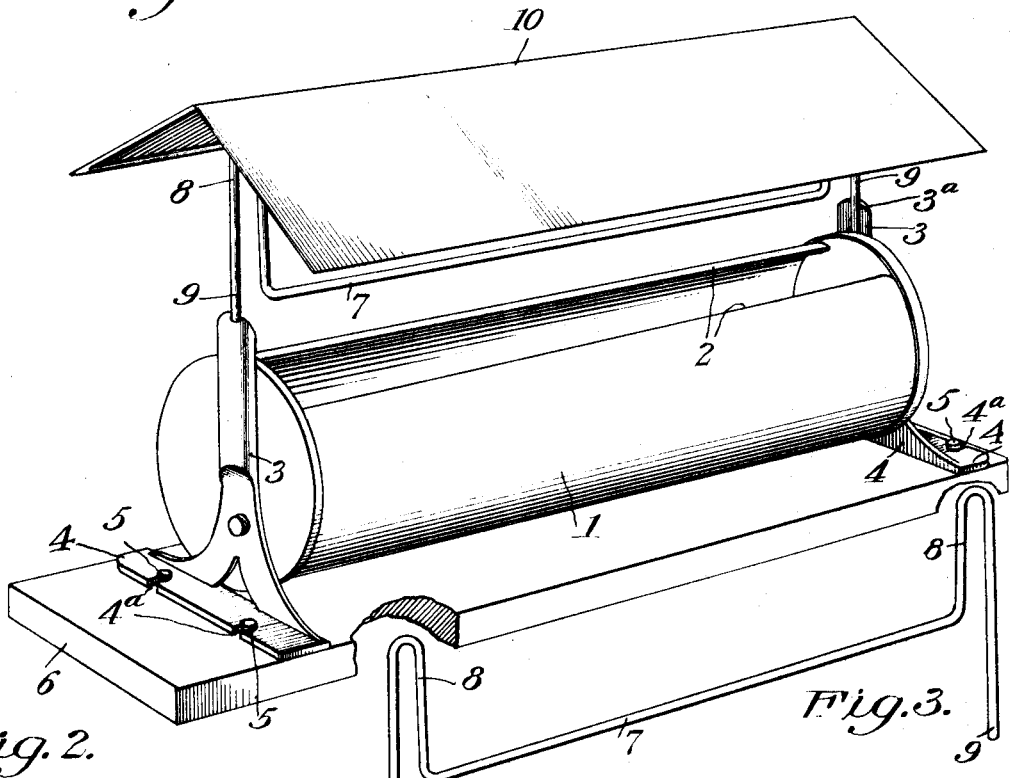
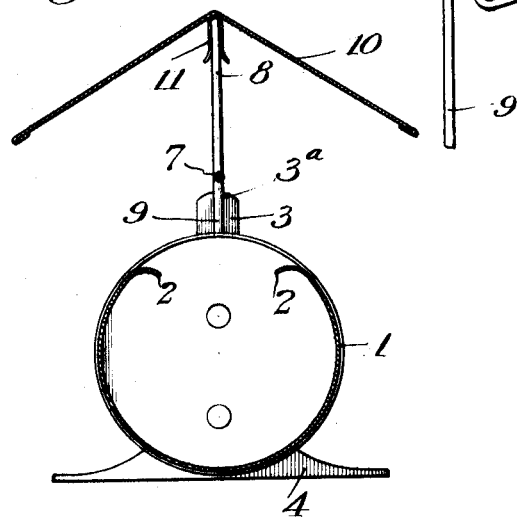
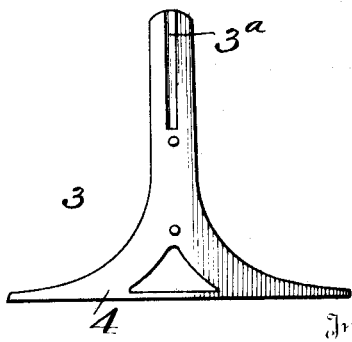
Witnesses
Fenton Belt
H. Joseph Doyle
Inventor
Frank Enos Jr.
By
Attorney

UNITED STATES PATENT OFFICE.

FRANK ENOS, JR., OF NORWICH, CONNECTICUT, ASSIGNOR TO THE NORWICH AUTOMATIC FEEDER COMPANY, OF NORWICH, CONNECTICUT, A CORPORATION OF CONNECTICUT.

CHICK-FEEDER.

1,138,365.  Specification of Letters Patent.  Patented May 4, 1915.

Application filed August 12, 1914. Serial No. 856,466.

*To all whom it may concern:*

Be it known that I, FRANK ENOS, Jr., a citizen of the United States, residing at Norwich, county of New London, State of Connecticut, have invented certain new and useful Improvements in Chick-Feeders; and I do declare the following to be a full, clear, and exact description of the invention, such as will enable others skilled in the art to which it appertains to make and use the same.

This invention relates to the subject of feeders for poultry and the like, and the main object of the same is to produce a feeder that is composed of few parts which are readily separable so that cleaning is facilitated, and also to produce a feeder in which simple and effective means are provided for preventing the poultry climbing into the feeder; splashing or otherwise displacing the food from the feeder, and to provide simple and effective means for protecting the food within the feeder as well as the stock being fed during inclement weather.

A simple and preferred embodiment of the feeder is shown in the accompanying drawings, wherein—

Figure 1 is a perspective view of the improved feeder. Fig. 2 is a transverse sectional view thereof. Fig. 3 is a detail perspective view of the guard for the feeder. Fig. 4 is a view in elevation of one of the supporting standards for the feeder.

The improved feeder comprises in its general organization a trough 1 which may be of cylindrical or other preferred shape and which has the longitudinal edges of its open top portion projecting inwardly, as indicated at 2, to serve as splash guards so that displacement of the food by the poultry incidental to feeding is prevented. A convenient manner of forming the splash guards 2 is by abruptly curving inwardly the longitudinal edges of the open top of the trough 1, but it is to be understood that any other manner of shaping said longitudinal edges of the trough opening so that they overhang the interior of the trough is considered to be well within the scope of the invention.

The trough 1 is mounted upon end standards 3, said standards being riveted or otherwise fastened to the ends of the trough, and are preferably flattened on their inner surfaces so that they lie firmly against the ends of the trough. The lower portions of the standards are provided with flattened feet 4 that project transversely beyond the sides of the trough so that they may rest firmly on the ground or other surface, and said feet are also provided with notches or the like 4$^a$ adjacent one of their longitudinal edges so that they may receive screws or other fasteners 5 to detachably fasten the feet to a base support 6, which, in the present instance, has been shown as a board.

The upper portions of the standards 3 project well above the trough 1 and are centrally disposed relative to the ends of said trough and are provided with longitudinal grooves 3$^a$. Preferably the grooves 3$^a$ are formed in the inner surfaces of the standards 3 and extend down the standards far enough to cause their lower portions to be overlapped by the ends of the trough, the arrangement being such that the lower end portions of the grooves and the ends of the trough coöperate to produce sockets, as will be explained.

A guard 7 is provided for preventing the poultry climbing into the trough 1, the guard being preferably formed of a single length of wire that extends centrally and longitudinally a short distance above the trough opening. The guard is preferably formed of wire that is of too small a diameter to permit the poultry using the same as a perch, and at its ends, is shaped to provide upstanding roof supports 8 which may be of an inverted U-shape, the end, or outer, legs 9 of which slidably engage the grooves 3$^a$ of the standards 3 and extend into the sockets formed by said grooves and the ends of the trough. This arrangement readily permits the removal or replacement of the guard. The guard is preferably of such a length that it is necessary to slightly contract the bends in its ends to seat the legs 9 in the grooves 3$^a$, a feature of the invention that is desirable in that when so seated, the expansion of said bends causes the legs 9 to bind in the grooves 3$^a$ and thereby firmly retain the guard in its trough-protecting position.

A removable roof 10 is provided for the feeder, the roof being preferably formed of sheet metal and of a triangular shape and is of a size that it overhangs the ends and sides of the feeder in spaced relation. The inner surface of the roof at its apex is provided with spring clips 11 which snap over the supports 8 and thereby retain the roof in trough-sheltering position.

The poultry feeder can be used in connection with all kinds and sizes of poultry and is also capable of being used in connection with animals. It has been found to be of great utility in connection with the feeding of young poultry where it is desirable to feed the young poultry separate from the old poultry. In such connection, the feeder is made small, and the guard 7 is so disposed relative to the opening in the trough that large poultry cannot obtain access to the trough.

The use of the rain top 10 is of special utility in inclement weather for it entirely covers the trough 1 and its overhanging projections protect the feed within the trough. It is a well known fact that thousands of young chicks are lost annually from the spoiling of a feed commonly known as "mash", which, in the ordinary feed boxes, is wet by sudden showers in the spring and then soured or spoiled by a clear hot sun, and the protection afforded by the roof 10 obviates this common trouble to the poultryman. It will also be apparent that the roof acts as an additional preventive against older poultry obtaining access to the trough. The roof being removable, the same can be readily disengaged from the supports 8, thus admitting of thorough cleaning of the trough when necessary.

What I claim as new is:—

1. A feeder comprising a trough, standards carried by the ends thereof and having supporting feet, said standards projecting above the trough and provided with longitudinal grooves, a guard extending longitudinally above the trough and provided with roof supports at its ends which terminate in legs adapted to be detachably seated in said grooves, and a roof adapted to overhang the sides and ends of the trough and having means for detachably engaging the roof supports.

2. A feeder comprising a trough having the longitudinal edges of its opening projecting inwardly to form splash guards, standards supporting the trough and provided with guard seats, and a guard extending centrally and longitudinally of the trough-opening and detachably engaging said seats.

3. A feeder comprising a trough, standards carried by the ends thereof and provided with means which coöperate with the ends of the trough to form guard sockets, and a guard for preventing poultry climbing into the trough and provided with end legs that seat in said sockets.

4. A feeder comprising a trough, supporting standards carried by the ends of the trough and provided with guard seats, a guard extending longitudinally of and in proximity to the trough opening and having its end portions provided with upstanding roof supports and terminating in legs that engage the seats, and a roof provided with means for detachably engaging the supports.

5. A feeder comprising a trough, standards therefor provided with flat feet that extend transversely of and project beyond the trough, said feet being provided with openings for the reception of fasteners, the standards projecting above the trough and being provided with guard seats, and a guard engaging the seats.

6. A feeder comprising a trough, standards carried by the ends thereof, said standards projecting above the trough and being provided with longitudinal grooves the lower portions of which coöperate with the ends of the trough to form sockets, and a guard extending centrally and longitudinally of and in proximity to the trough opening and having end legs that slidably engage the grooves and extend into the sockets.

7. A feeder comprising a trough, standards carried by the ends thereof and provided with guard seats, a guard extending longitudinally and centrally above the trough opening and having its end portions formed into upright roof supports that terminate in depending legs and engage said seats, and a roof provided with means for engaging the roof supports.

8. A feeder comprising a trough, standards carried by the ends thereof and provided with guard seats, a guard formed of resilient material and extending above and longitudinally of the top of the trough, the guard having its end portions bent into substantially inverted U-shape upright roof supports that terminate in legs for engaging said seats, and a roof provided with means for engaging said supports.

9. A feeder comprising a trough, standards carried by the trough and provided with guard seats, a guard extending over the trough and having its ends seated in said seats, said guard having roof supports adjacent its ends, and a roof overhanging the ends and sides of the trough and provided with spring clips for detachably engaging said roof supports.

In testimony whereof I affix my signature in presence of two witnesses:

FRANK ENOS, Jr.

Witnesses:
E. J. CAMPBELL,
H. H. WALKER.